(12) United States Patent
Leete et al.

(10) Patent No.: US 6,684,272 B1
(45) Date of Patent: Jan. 27, 2004

(54) THROUGHPUT ENHANCEMENT FOR A UNIVERSAL HOST CONTROLLER INTERFACE IN A UNIVERSAL SERIAL BUS

(75) Inventors: Brian A. Leete, Beaverton, OR (US); John S. Howard, Portland, OR (US); Brad W. Hosler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,374

(22) Filed: Dec. 23, 1999

(51) Int. Cl.[7] .................................................. G06F 3/00
(52) U.S. Cl. ............................ 710/52; 710/15; 710/48; 710/53; 710/313
(58) Field of Search ............................. 710/52, 57, 310

(56) References Cited

U.S. PATENT DOCUMENTS

| | | | | |
|---|---|---|---|---|
| 5,860,119 A | * | 1/1999 | Dockser | 711/156 |
| 5,918,073 A | * | 6/1999 | Hewitt | 710/52 |
| 5,974,486 A | * | 10/1999 | Siddappa | 710/53 |
| 6,370,603 B1 | * | 4/2002 | Silverman et al. | 710/72 |
| 6,393,493 B1 | * | 5/2002 | Madden et al. | 709/321 |
| 6,529,988 B1 | * | 3/2003 | Yoshikawa et al. | 710/305 |
| 6,590,897 B1 | * | 7/2003 | Lauffenburger et al. | 370/395.6 |

* cited by examiner

Primary Examiner—Jeffrey Gaffin
Assistant Examiner—Eron Sorrell
(74) Attorney, Agent, or Firm—Fish & Richardson P.C.

(57) ABSTRACT

A timing enhancement for a USB controller determines if a short data packet is present. If so, data is placed in a buffer. If the buffer is full, data is sent. If the buffer is not full, the system looks to see if more data is available, if so takes it, if not it sends whatever is available.

9 Claims, 1 Drawing Sheet

THROUGHPUT ENHANCEMENT FOR A UNIVERSAL HOST CONTROLLER INTERFACE IN A UNIVERSAL SERIAL BUS

BACKGROUND

The Universal Serial Bus ("USB") specification has made it possible for a number of different peripheral devices to be easily attached to a computer. The USB can be used to control common peripherals. The programmability and ease of use of USB has often led to an attempt to obtain even more bandwidth from existing implementations.

The USB has been implemented in different main formats. The Open Host Controller Interface, "OHCI", and the Universal Host Controller Interface, "UHCI", are two of the popular formats. Both provide full compliance with the USB specification and its peripherals.

UHCI defines how the USB controller talks to the host computer and operating system. In attempting to maximize the speed of a USB interface, the communication between the host controller and the host can be targeted.

SUMMARY

The present application defines a method of controlling communications in a Universal Serial Bus system, that includes storing communications from the Universal Serial Bus controller into a buffer; and using the buffer to increase a throughput speed.

BRIEF DESCRIPTION OF DRAWINGS

These and other aspects will be described in detail with reference to the accompanying drawings, wherein.

DETAILED DESCRIPTION

Figure 1:
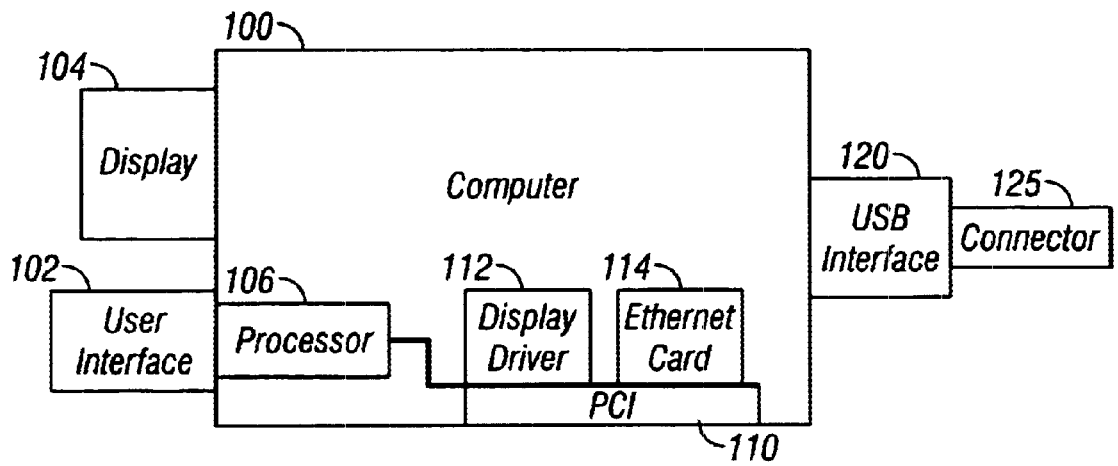
FIG. 1 shows a basic computer system including its Universal Host controller Interface and USB connections.

FIG. 1 shows a basic computer system including its Universal Host Controller Interface and at least some of its USB connections. The computer 100 includes the usual computer parts, including a user interface 102 and display 104. The computer also includes a processor 106 controlling the operation of specified peripherals according to a stored program, e.g., an operating system. Many of the peripherals can be connected to an internal bus in the computer, e.g., the Peripheral Component Interface (PCI) bus. FIG. 1 shows a display driver 112, and an Ethernet card 114. A USB interface 120 is connected to the computer 100 to interface with information to and from the computer 100. Many of the parts for the USB interface 120 are available off the shelf. The USB interface 120 has at least one USB connector 125.

The Universal Serial Bus communicates its data via transfers. A controller requests a transfer of either 8, 16, 32 or 64 bytes. This becomes the size of the requested data packet.

However, if an incomplete packet is received, the host controller stops and waits for the controlling process to schedule the next transaction. The scheduling occurs at each host controller interrupt time, e.g. every one millisecond.

The inventors realized that this short packet mode can cause significant delays in throughput. Devices such as Ethernet controllers or high speed modems use data "transfers" to the host that cannot be divided into an integral numbers of USB data packets. Many, if not all, of the data transfers become short transfers i.e., they are arbitrarily terminated when a packet is short.

Again, the packet is short when the controller asks for n (8, 16, 32, or 64) and gets less than x. The worst case analysis occurs when the throughput of a given end point to a single transfer becomes once each interrupt time, —i.e. it is limited to a millisecond. This can significantly slow the data transfer of the USB:

The present invention teaches a technique of prefetching and buffering the data from a USB device. This allows more than one transfer to occur in a single time frame. Throughput of the device can be improved significantly, e.g., by as much as a factor of 18.

Figure 2:
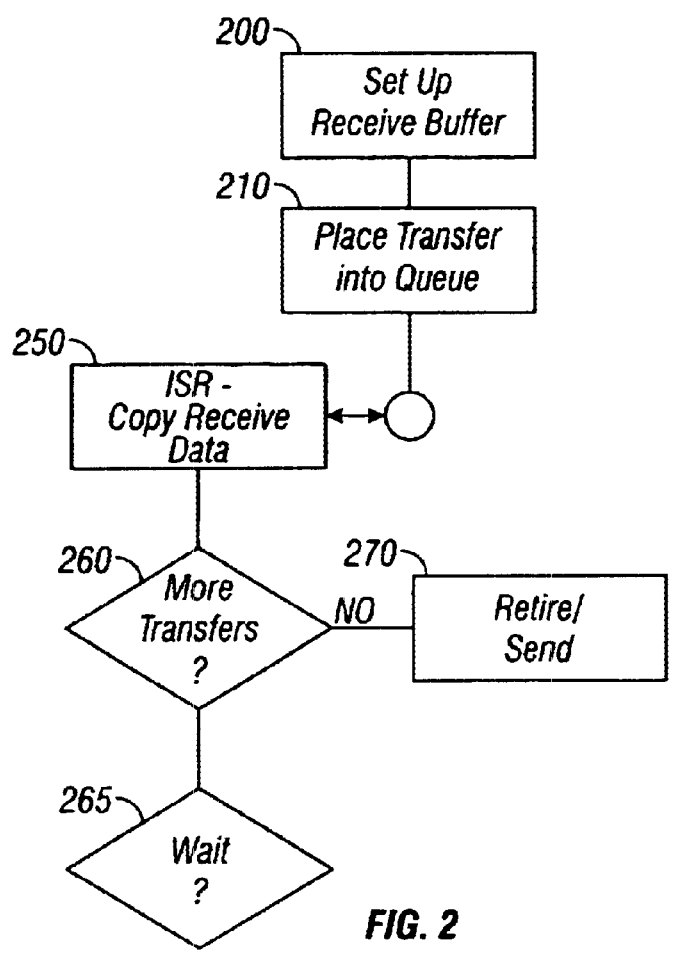
FIG. 2 shows a flowchart of operation.

The technique works as explained with reference to the flowchart of FIG. 2.

First, the driver is defined which sets up a special receive buffer at 200.

Top Half of the Driver (High Level Software User Routines)
 InitializeEndpoint( )
  Set up Receive Buffer
  Submit a number of USB packets to the Host Controller Hardware.
 When a data transfer is requested, the transfer is placed into a transfer queue 210
TransferInitialization ( )
  Put Transfer into a Transfer Queue.
  An interrupt service routine is then defined which carries out the transfer at each interrupt e.g. around a millisecond.
InterruptServiceRoutine ( )
 While there are transfers in queue {
  Copy data from the Receive buffer to the user buffer
  If (short packet is detected) then transfer is short—enough data has been transferred, retire transfer Submit more transactions to host controller}.

The service routine first determines if there are transfers in the receive queue at step 250. When there are transfers in the queue, the data is copied from the receive buffer to the user buffer at step 250.

After that, more transactions are submitted to the host controller at step 260. If no transfers are still pending in the queue, the transfer is retired, meaning that the data is sent immediately at 270. Otherwise, the data stays in the buffer waiting for more information to be received at 265. However, that information is received during the current interrupt, instead of waiting for a later interrupt.

In this way, the throughput of the UCHI host controller can be improved.

Other embodiments are within the disclosed embodiment. What is claimed is:

1. A method of improving throughput in a Universal Serial Bus system, comprising:
 prefetching and buffering each of a plurality of Universal Serial Bus data streams prior to transfer of each to a processor; and
 determining an end of communication and determining if another USB communication is buffered and if so, sending both communications to allow more then one transfer from more than one of said data streams to be completed during each Universal Serial Bus interrupt time.

2. A method as in claim 1 wherein said interrupt occurs approximately once each millisecond.

3. A method as in claim 1 wherein prefetching and buffering comprises obtaining information and placing said information into a transfer queue.

4. A method as in claim 3 wherein buffering comprises determining a characteristic related to transfer of the information, and sending the information when the buffer is full.

5. A method as in claims 3, wherein buffering comprises determining and end of short packet whether all available data for a current time period has been received in said transfer queue, and sending said data if so.

6. An apparatus comprising a machine-readable storage medium having executable instructions for controlling communications in a Universal Serial Bus system, the instructions enabling the machine to;

store Universal Serial Bus controller information into a buffer;

detecting an end of a universal serial bus short packet;

sending said information in said buffer responsive to detecting said end of said universal serial bus short packet even if shorter than a complete requested buffer length; and wherein said detecting said end comprises determining at each of a plurality of interrupt times.

7. A computer system, comprising:

a Universal Serial Bus controller;

a buffer, which stores Universal Serial l bus information;

a processor to feed universal serial bus information into said buffer, responsive to a timing indication,to determine if said information indicates an end of a short packet event buffer includes less information than requested, and to send said data in said buffer even if said buffer has less information than requested if said short packet is detected; and wherein said processor determines if additional data is available during said timing indication, and sending said data it not.

8. A method of controlling communications in a Universal Serial Bus system in a host controller, comprising:

storing Universal Serial Bus controller information into a buffer;

detecting an end of a universal serial bus short packet; and sending said information in said buffer responsive to detecting said end of said universal serial bus short packet even if shorter than a complete requested buffer length; and wherein said sending comprises checking to determine if additional information from said universal serial bus controller is awaiting transfer when said and of said Universal serial bus short packet is detected, and immediately sending said universal serial bus short packet if no additional information is waiting, otherwise receiving said additional information.

9. A computer system, comprising:

a Universal Serial But controller;

a buffer, which stores Universal Serial bus information; and a processor to feed universal serial bus information into said buffer, responsive to a timing indication, to determine if said information indicates an end of a short packet event buffer includes less information than requested, and to send said data in said buffer even if said buffer has less information than requested if said short packet is detected; and wherein said processor checks to determine if additional information from said universal serial bus is in said buffer when said end of said universal serial but short packet is detected, and immediately sending said Universal serial bus short packet if no other information is waiting, otherwise receiving said additional information.

* * * * *